US005623707A

United States Patent [19]
Kusaka

[11] Patent Number: 5,623,707
[45] Date of Patent: Apr. 22, 1997

[54] AUTO FOCUS ADJUSTMENT SYSTEM AND AUTO FOCUS ADJUSTMENT METHOD

[75] Inventor: Yosuke Kusaka, Kanagawa-ken, Japan

[73] Assignee: Nikon Corporation, Tokyo, Japan

[21] Appl. No.: 489,460

[22] Filed: Jun. 12, 1995

[30] Foreign Application Priority Data

Aug. 26, 1994 [JP] Japan .................................. 6-202475

[51] Int. Cl.$^6$ ................................................. G03B 13/36
[52] U.S. Cl. .................................. 396/91; 396/123
[58] Field of Search ............................ 354/400, 402, 354/406, 407, 408

[56] References Cited

U.S. PATENT DOCUMENTS

| | | | |
|---|---|---|---|
| 4,557,577 | 12/1985 | Shinoda | 354/400 |
| 4,614,418 | 9/1986 | Ishizaki et al. | 354/407 |
| 5,097,282 | 3/1992 | Itoh et al. | 354/402 |
| 5,121,151 | 6/1992 | Kawabata et al. | 354/402 |
| 5,227,828 | 7/1993 | Kirigaya | 354/400 |
| 5,258,801 | 11/1993 | Kusaka et al. | 354/402 |
| 5,479,234 | 12/1995 | Kitaoka | 354/402 |

FOREIGN PATENT DOCUMENTS 5-5929  1/1993  Japan .

*Primary Examiner*—W. B. Perkey
*Attorney, Agent, or Firm*—Oliff & Berridge

[57] ABSTRACT

An auto focus adjustment system includes an arrangement device, a focus detection device, a defocus amount determination device, and a drive control device. The arrangement device arranges a plurality of focus detection regions in a photographic field of a photographic optical system. The focus detection device detects a defocus amount that represents a deviation amount between an image plane and a predetermined focus plane for each detection region. The defocus amount determination device determines a final defocus amount based on a plurality of defocus amounts detected by the defocus detection device. The defocus amount determination device selects defocus amounts greater than a specified negative defocus amount. From among these selected defocus amounts, the defocus amount determination device determines a least defocus amount as the final defocus amount. The drive control device then controls the driving of the photographic optical system based on the final defocus amount determined by the defocus amount determination device. As a result, the auto focus adjustment system permits a photographer to maintain an intended subject in focus even when an undesired subject crosses in front of and close to the camera.

28 Claims, 12 Drawing Sheets

AUTO FOCUS ADJUSTMENT SYSTEM AND AUTO FOCUS ADJUSTMENT METHOD

BACKGROUND OF THE INVENTION

1. Field of the Invention

The present invention relates to photography, and, in particular, to an auto focus adjustment system and method used to control a photographic optical system of a camera.

2. Description of Related Art

An auto focus adjustment system is known in which the focus adjustment condition of the photographic optical system or the defocus amount, which is the distance that the image plane of the photographic optical system deviates from the predicted focus plane, is detected for each one of several focus detection regions arranged within the shooting field. A final defocus amount is determined from among the plurality of defocus amounts detected. Accordingly, the focus condition (i.e., the condition in which the camera is focussed upon the desired subject) is obtained by driving the photographic optical system according to this final defocus amount.

The following two methods are known for determining the final defocus amount from among a plurality of defocus amounts:

(1) Current status priority mode

In this mode, from a plurality of defocus amounts, the one with the smallest absolute value is selected as the final defocus amount. For example, suppose defocus amounts D1, D2, and D3 are obtained for the three focus detection regions shown in FIG. 16.

In FIG. 16, the horizontal axis represents the position of the focus detection region and the vertical axis represents the defocus amount. In the present specification, the defocus amount, in the case in which the image plane of the photographic optical system is formed on the photographic optical system side of the predicted focus plane, is defined as positive. In the case in which the image plane is formed on the opposite side, the defocus amount is defined as negative. Therefore, a negative defocus amount represents the minimum defocus amount of the closest side.

In the current status priority mode, a defocus amount D1 having the smallest absolute value from among the three defocus amounts is selected.

(2) Closest side priority mode

In this mode, a defocus amount corresponding to the closest subject from among a plurality of defocus amounts is selected as the final defocus amount.

For example, suppose defocus amounts D1, D2, and D3 are obtained in each of three focus detection regions shown in FIG. 17. In the closest side priority mode, the defocus amount D3 corresponding to the closest subject 3 is selected as the final defocus amount.

However, the following problems arise in a conventional auto focus adjustment system in which the final defocus amount is determined according to the methods described above:

(1) In the current status priority mode, suppose that focus detection is executed by an auto focus adjustment system of a camera that establishes three focus detection regions FL, FC, and FR within the shooting field as shown in FIG. 3, for example, in three subject field regions L, C, and R, as shown in FIG. 18. Further, suppose that subject 1, subject 2 and subject 3 are located within these three subject field regions L, C, and R, respectively, at the shooting length R0. In such a shooting condition, the auto focus adjustment system of a camera adjusts the focus of the photographic optical system for a position at a distance equal to shooting length R0.

In this instance, suppose that subject 2 approaches the camera and reaches a shooting length R1 after the photographic optical system has been adjusted to a distance equal to the shooting length R0. In this case, subjects 1 and 3 remain in regions L and R, respectively, at a distance equal to the shooting length R0. Accordingly, in the current status priority mode, the defocus amount with the smallest absolute value from among a plurality of defocus amounts (i.e., defocus amounts corresponding to subject 1 or subject 3 in this case) is selected as the final defocus amount and the focus condition for subject 1 or subject 3 is maintained as the result of adjusting the focus according to the final defocus amount.

In general, when some of the subjects approach the camera, the subject closest to the camera is the one on which the photographer desires to focus. However, in the current status priority mode, subject 2, which is closest to the camera, is out of focus and blurred.

(2) In the closest distance priority mode, suppose that the focus detection routine is executed by an auto focus adjustment system of a camera that establishes three focus detection regions FL, FC, and FR within the shooting field as shown in FIG. 3, for example, in three subject field regions L, C, and R, as shown in FIG. 19. Further, suppose that subject 1, subject 2, and subject 3 are located within these three subject field regions, L, C, and R, respectively, at a distance equal to the shooting length R0. In such a condition, the auto focus adjustment system of the camera adjusts the focus of the photographic optical system to a position with a distance equal to the shooting length R0.

Suppose that an undesired object crosses in front of the camera at a distance R2 after the photographic optical system is adjusted to a distance equal to the shooting distance R0. The size of this undesired object is assumed to be smaller than the total size of focus detection regions FL, FC, and FR in FIG. 3. In the closest distance priority mode, the smallest defocus amount from among a multiplicity of defocus amounts (i.e., a defocus amount corresponding to the subject at the closest distance) is selected as the final defocus amount. Thus, the camera is focussed on the undesired object at the closest distance as a result of adjusting the focus according to the final defocus amount.

Thus, when the undesired object crosses in front of the plurality of subjects, the intended subjects become out of focus and blurred despite the photographer's desire to maintain the subjects in focus.

SUMMARY OF THE INVENTION

An object of the present invention is to provide an auto focus adjustment system and method in which focus is maintained on intended subjects while avoiding focusing on undesired objects that cross in front of the camera at closer distances.

In order to achieve this and other objects, the auto focus adjustment system of the present invention is provided with an arrangement device, a focus detection device, a defocus amount determination device and a drive control device. The arrangement device arranges a plurality of focus detection regions in a photographic field of a photographic optical system. The focus detection device detects a defocus amount representing a deviation amount between an image plane of the photographic optical system and a predetermined focus plane for each of the detection regions. The defocus amount determination device determines a final defocus amount in accordance with a plurality of defocus amounts detected by the focus detection device. The drive control device controls the driving of the photographic optical system in accordance with the final defocus amount determined by the defocus amount determination device.

The defocus amount is defined as positive if the image plane of the photographic optical system is formed on a photographic optical system side of a focus plane. Correspondingly, the defocus amount is defined as negative if the image plane is formed on a side opposite the photographic optical system side. The defocus amount determination device selects defocus amounts that are greater than a predetermined negative defocus amount from a plurality of defocus amounts detected by the focus detection device. The defocus amount determination device determines a least defocus amount from among selected defocus amounts as the final defocus amount.

The defocus amount determination device changes the predetermined negative defocus amount in accordance with various attributes, including: a focal length of the photographic optical system, a conversion coefficient that converts the final defocus amount to a driving amount of the photographic optical system, a photographic mode, photometric results determined with respect to a photographic subject, a degree of confidence in focus detection results detected by the focus detection device, a F-value at an open aperture of the photographic optical system, a shooting magnification, a subject image plane moving speed and a time interval required to move from a non-focus condition to a focus condition. In addition, the defocus amount determination device can determine, from among a plurality of defocus amounts detected by the focus detection, a defocus amount having a minimum absolute value as a final defocus amount if a focal length of the photographic optical system is less than a predetermined focal length.

According to one embodiment, the auto focus adjustment system includes an optical system that forms a subject image on a focus plane, a focus detection device, a setting device, a defocus amount determination device and a driving device. The focus detection device detects first defocus amounts of the subject image formed by the optical system in a plurality of focus detection regions arranged in the focus plane. The setting device sets a defocus amount range. The defocus amount determination device determines a second defocus amount in accordance with the first defocus amounts within the defocus amount range set by the setting device from among a plurality of first defocus amounts detected by the focus detection device. The driving device drives the optical system in accordance with the second defocus amount determined by the defocus determination device.

The second defocus amount can be determined to be a defocus amount corresponding to a closest subject from among the first defocus amounts included in the defocus amount range set by the setting device. The setting device changes the defocus amount range in accordance with one or more of optical characteristics of the optical system, characteristics of the subject image and an elapsed time.

Still further, another embodiment may include an optical system that forms a subject image on a predetermined focus plane, a focus detection device, a defocus amount determination device, a selection device, a driving device, and a display device. The focus detection device detects first defocus amounts of the subject image formed by the optical system in a plurality of focus detection regions arranged in the focus plane. The defocus amount determination device determines defocus amounts. The defocus amount determination device has two modes: a first determination mode to determine a second defocus amount by a first method in accordance with a plurality of first defocus amounts detected by the focus detection device, and a second determination mode to determine a second defocus amount by a second method in accordance with the plurality of first defocus amounts. The first method is different from the second method. The selection device selects the first determination mode and the second determination mode of the defocus amount determination device. The driving device drives the optical system in accordance with the second defocus amount determined by the defocus amount determination device. The display device displays the determination mode selected by the selection device.

Even further, another embodiment may include an optical system that forms a subject image on a predetermined focus plane, a focus detection device, a determination device, a first switching device, a second switching device and a driving device. The focus detection device detects first defocus amounts of the subject formed by the optical system in a plurality of focus detection regions arranged in the predetermined focus plane. The determination device, which operates in at least one of a first determination mode and a second determination mode, determines a second defocus amount.

In the first determination mode, the determination device determines the second defocus amount by a first method in accordance with a plurality of first defocus amounts detected by the first detection device. In the second determination mode, the determination device determines the second defocus amount by a second method in accordance with the plurality of first defocus amounts. The first method is different from the second method. The first switching device automatically switches the first determination mode and the second determination mode. The second switching device manually switches between the first determination mode and the second determination mode. The driving device drives the optical system in accordance with the second defocus amount determined by the determination device.

Other objects, advantages and salient features of the invention will become apparent from the following detailed description taken in conjunction with the annexed drawings, which disclose preferred embodiments of the invention.

BRIEF DESCRIPTION OF THE DRAWINGS

A complete understanding of the present invention may be obtained by reference to the accompanying drawings, and subsequent detailed description wherein like reference numerals refer to like elements and wherein.

DETAILED DESCRIPTION OF PREFERRED EMBODIMENTS

Figure 1:
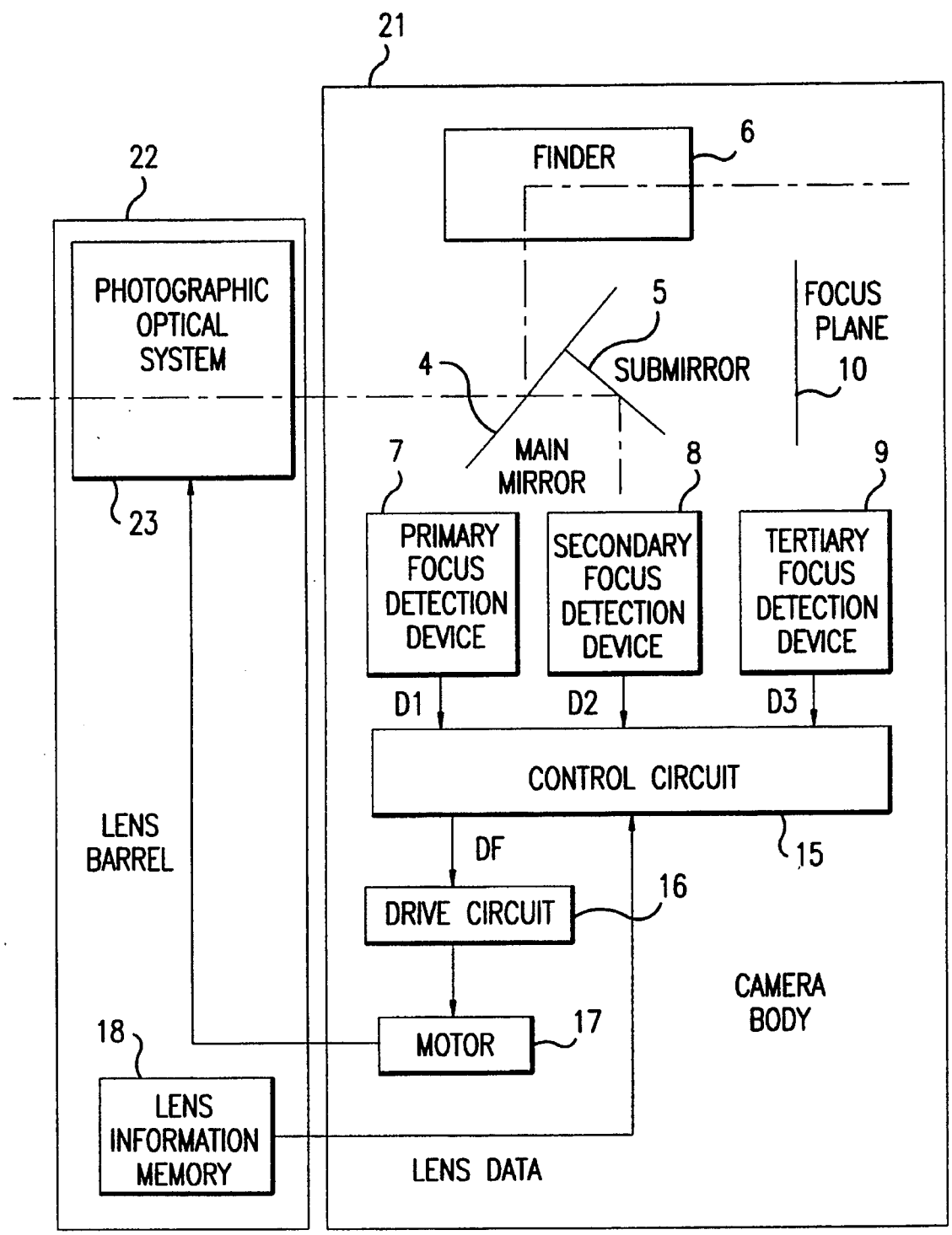
FIG. 1 is a functional block diagram that depicts the structure of a camera equipped with an auto focus adjustment system of the present invention.

FIG. 1 shows a block diagram representing a structure of an embodiment in which the present invention is applied to a single lens reflex camera.

Figure 2:
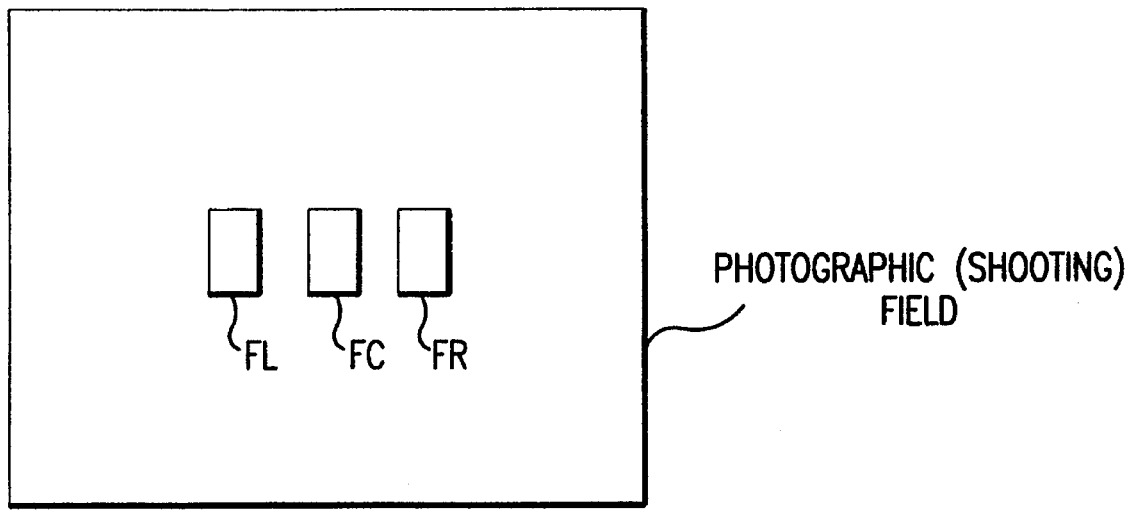
FIG. 2 is a schematic that depicts a focus detection region established within the photographic field.
Figure 3:
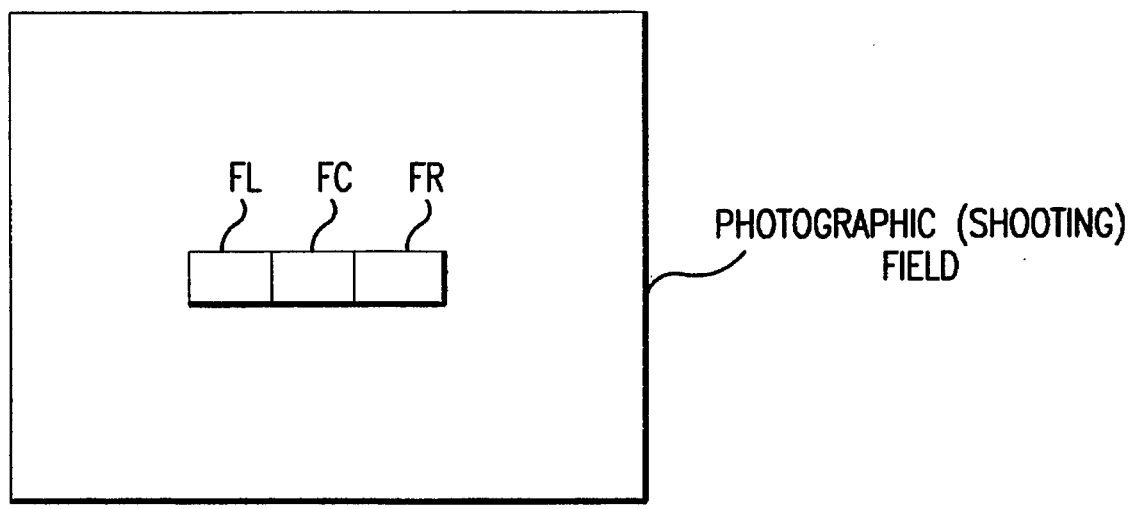
FIG. 3 is a schematic that depicts another focus detection region established within the shooting field.

In FIG. 1, a lens barrel 22, which is interchangeable, is shown mounted to a camera body 21. A photographic optical system 23 is disposed within the lens barrel 22. Light rays from the subject pass through the photographic optical system 23 and are divided in the directions of a sub-mirror 5 and a finder 6 by half-mirrors that together comprise a main mirror 4. The structure of the finder 6, which is known, includes a pentagonal prism and a display device to display a focus detection region on the screen surface. A photographer can observe the focus detection region display (hereinafter the "focus frame") overlaying the subject image within the shooting field. For example, if three focus detection regions FL, FC, and FR are established within the shooting field, the focus frame shown in FIG. 2 and FIG. 3 is observed within the finder.

Light rays that are further deflected towards the bottom of the camera body by the sub-mirror 5 pass through a first focus detection system 7, a second focus detection system 8 and a third focus detection system 9, which are disposed in an operative relationship with a predicted focus plane (film surface) 10 of the photographic optical system 23. These three focus detection systems 7, 8, and 9 correspond, respectively, to the focus detection regions FL, FC, and FR shown in FIG. 2 and FIG. 3. These focus detection systems detect the respective defocus amounts D1, D2, and D3 at each respective focus detection region FL, FC, and FR. Together, these focus detection systems compute the deviation of the image plane of the photographic optical system 23 from the predicted focus plane 10 (i.e., a positive or negative defocus amount).

Figure 4:
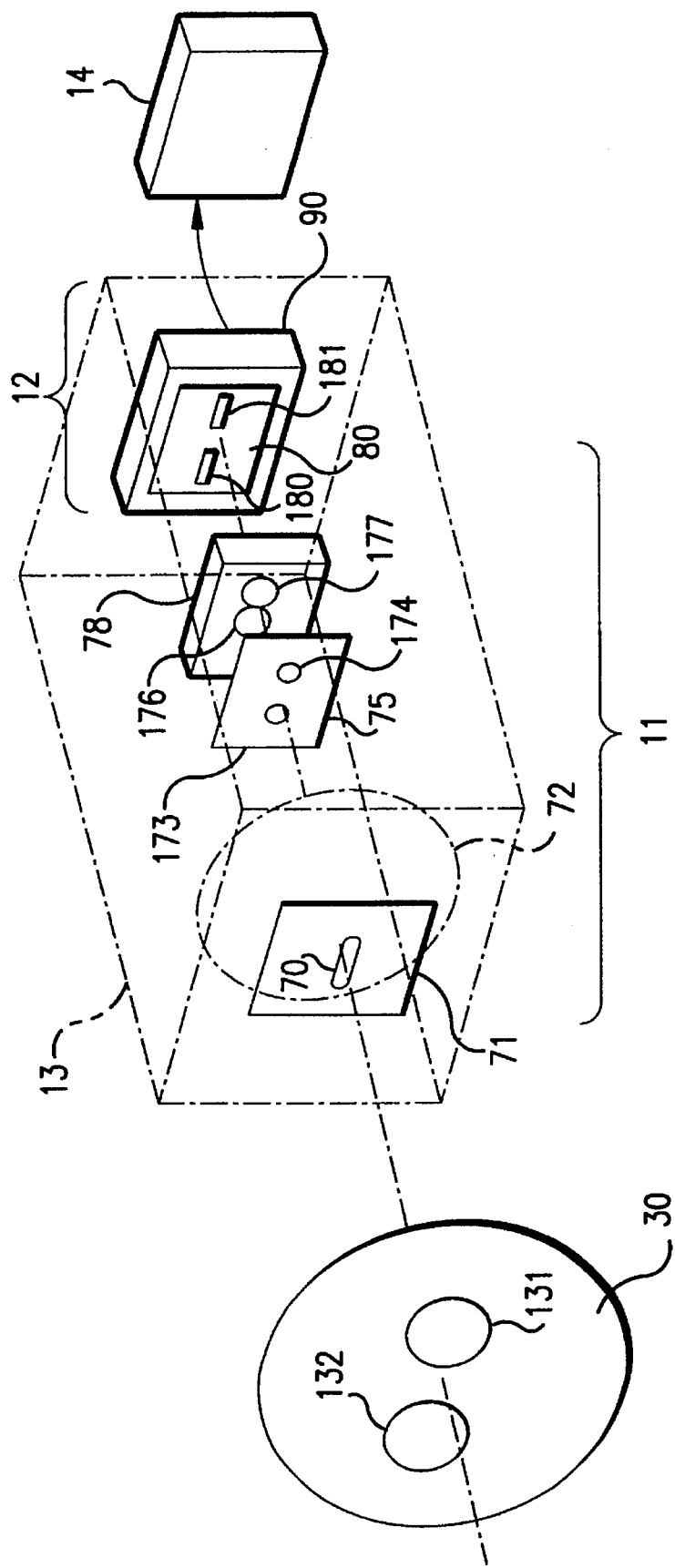
FIG. 4 is an oblique view that depicts the detailed structure of the focus detection system.

FIG. 4 shows the focus detection system in greater detail. Because focus detection systems 7, 8, and 9 are the same as described above, only one such structure is shown in FIG. 4. A representative focus detection system includes a focus detection optical system 11, an image sensor 12, a housing 13, and an algorithm device 14, such as a microcomputer.

The focus detection optical system 11 includes a vision mask 71 having a rectangular aperture section 70, a condenser lens 72, an aperture mask 75 having a pair of aperture stops 173 and 174, and a re-imaging optical system 78 having a pair of re-imaging lenses 176 and 177 formed as one unit using plastic optical material. An image sensor 12 includes a semiconductor chip or circuit board 80 having an electric charge accumulating CCD that includes a pair of light receiving units 180 and 181 and a ceramic package 90 that houses the semiconductor circuit board 80. The housing 13 is a holder that supports the focus detection optical system 11. The image sensor 12 is attached to the housing 13. An algorithm device 14 executes a known focus detection algorithm to determine the defocus amount based on output signals from the image sensor 12.

In a structure as described above, the focus detection regions FL, FC, and FR shown in FIG. 2 and FIG. 3 are determined according to the shape of the aperture section 70. The arrangement of the focus detection regions shown in FIG. 2 and FIG. 3 corresponds to a linear array of three focus detection systems shown in FIG. 4. The pair of aperture stops 173 and 174 are projected on two pairs of regions 131 and 132 that are symmetrical with respect to an optical axis of a plane near the exit pupil of the photographic optical system 3 that extends through the condenser lens 72.

Light rays from the subject pass through regions 131 and 132 and create a primary image in the vicinity of the vision mask 71. The primary image composed at the aperture section 70 of the vision mask 71 further passes through the condenser lens 72 and the pair of aperture stops 173 and 174, and a pair of secondary images are composed on a pair of light receiving units 180 and 181 of the image sensor 12 by a pair of re-imaging lenses 176 and 177. The relative positions of the pair of secondary images change according to the focus adjustment condition of the photographic optical system 23 (i.e., the distance in the direction of the optical axis between the predicted focus plane and the image plane of the photographic optical system 23). Therefore, the relative position relationship between the pair of secondary images is ascertained by obtaining electrical signals of the subject image by photo-electric conversion of the pair of secondary images on the pair of light receiving units 180 and 181. Using these results, a defocus amount representing the focus adjustment condition of the photographic optical system 23 is obtained. Moreover, the focus detection region shown in FIG. 3 can be established by using only one focus detection system, as shown in FIG. 4, and dividing the focus detection region into three blocks.

The control circuit 15 includes a microcomputer and its peripherals for executing various control sequences, as well as a control program to adjust the focus of the photographic optical system. The control program is explained below in greater detail. The control circuit 15 inputs defocus amounts D1, D2 and D3 from the first, second and third focus detection systems 7, 8 and 9, and inputs lens data such as focal length, magnification, and conversion coefficients for the defocus amount and the lens driving amount from the lens information memory 18 provided within the lens barrel 22. The control circuit 15 determines the final defocus amount DF based on these input data and converts the final defocus amount DF into the lens driving amount. The driving circuit 16 controls the driving of the motor 17, which is mechanically connected to and moves the photographic optical system 23.

The structure of the embodiment described above includes focus detection device having a first focus detection system 7, a second focus detection system 8, and a third focus detection system 9. The embodiment also includes a defocus amount determination device having a control circuit 15 and a drive control device having the control circuit 15 and the driving circuit 16.

Figure 5:
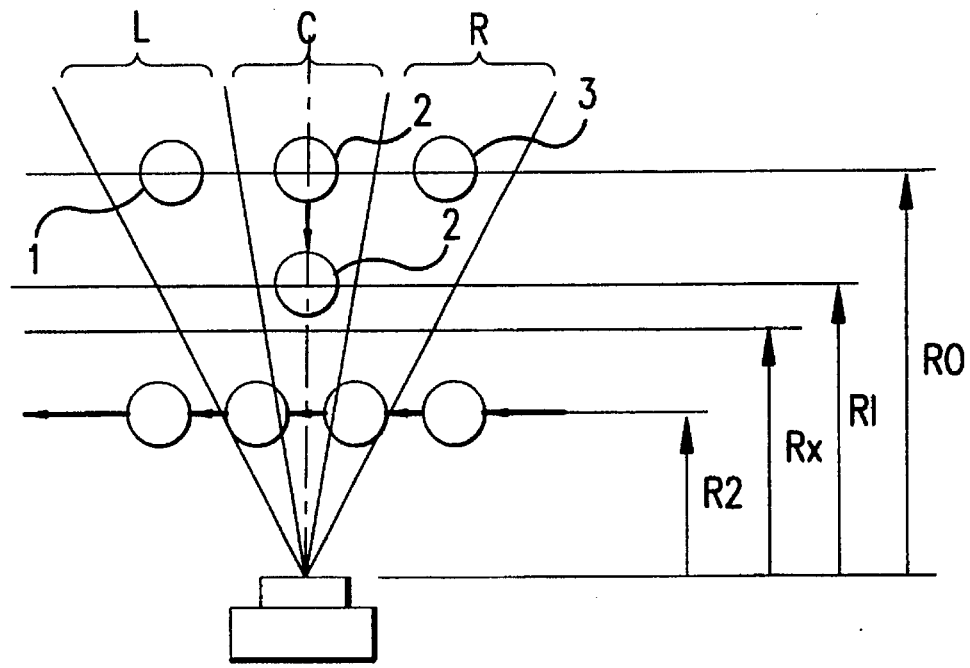
FIG. 5 is a diagram that depicts a method for determining the final defocus amount.

FIG. 5 shows a method of determining the final defocus amount. The auto focus adjustment system of the camera shown in FIG. 1 executes focus detection at three regions L, C, and R of the subject field after establishing the three focus detection regions FL, FC, and FR in the shooting field shown in FIG. 2 and FIG. 3. Here, subject 1, subject 2 and subject 3 are positioned at a shooting length R0 in the three subject field regions L, C, and R, respectively.

In such a shooting condition, the auto focus adjustment system of the camera first adjusts the focus of the photographic optical system 23 on a distance matching the shooting length R0. After adjusting the focus at the shooting length R0, the auto focus adjustment system adjusts the focus on the subject closest to the camera within a region closer than the shooting length R0 but further than the shooting length Rx.

Thus, if subject 2 approaches the camera to a position with length R1 (R1>Rx) after the camera has focused on a distance with length R0, the focus will be adjusted on subject 2. Moreover, if an undesired object passes across the camera field at a position near the camera with length R2 (R2<Rx), the camera maintains focus on subjects 1, 2 and 3, which are the shooting targets. In this case, however, the size of the undesired object is assumed to be smaller than the total area of the focus detection regions described in FIG. 2 and FIG. 3, as explained above in the preceding paragraphs.

In general, in the case when part of a subject approaches the camera, the shooting distance rarely decreases suddenly. In the case of an undesired object crossing in front of the camera, however, the shooting distance usually does decrease suddenly. Accordingly, by establishing an appropriate region in which the shooting length is allowed to change from the shooting length first determined after an initial focusing, the camera can maintain focus on a subject approaching the camera without interference from an object that crosses in front of the camera at a closer distance.

Until this point, the operation of a camera according to the present invention has been explained in connection with the shooting length to subjects. In an actual system, however, the final defocus amount must be determined based on defocus amounts resulting from focus detection.

Figure 6:
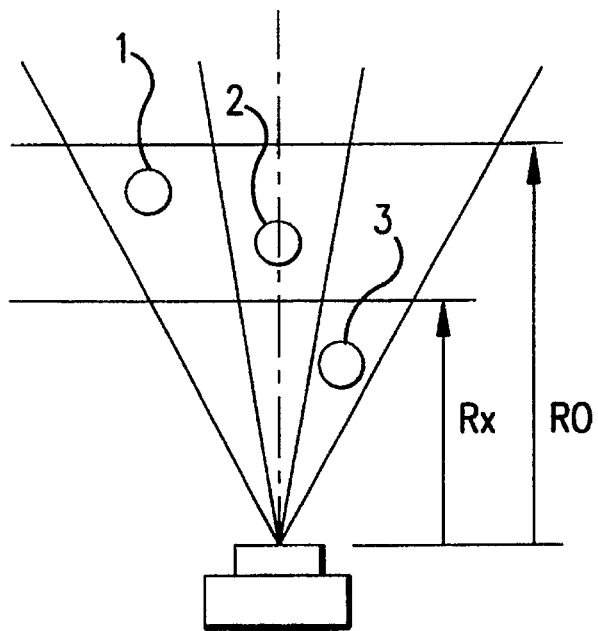
FIG. 6 is a diagram that depicts the correspondence between the shooting length and the defocus amount.
Figure 7:
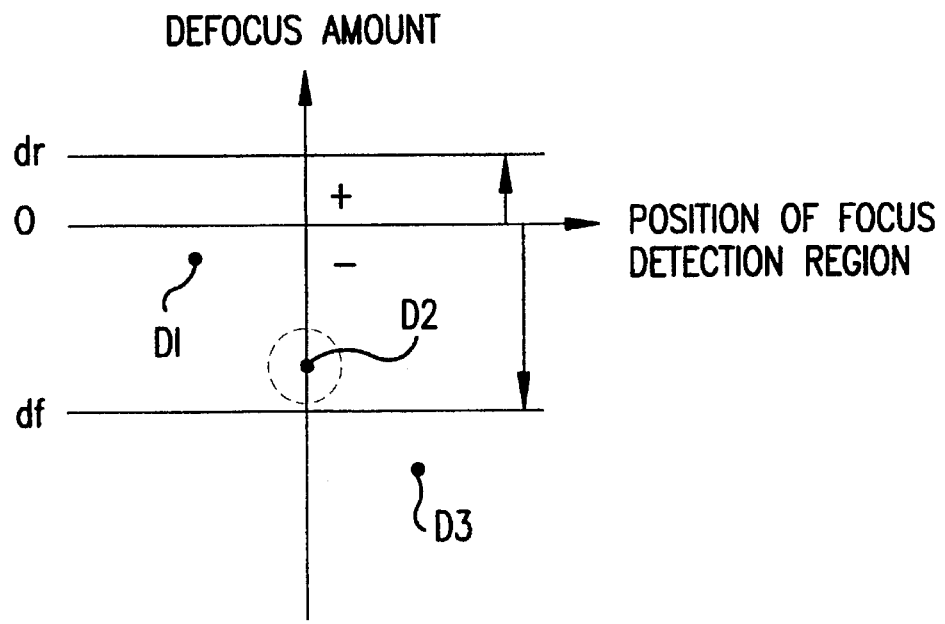
FIG. 7 is a diagram that depicts the correspondence between the shooting length and the defocus amount.

FIG. 6 and FIG. 7 show the correspondence between the shooting length and the defocus amount. FIG. 6 describes a condition in which each of subjects 1, 2 and 3 approaches the closest points after the subjects 1, 2 and 3 are brought into focus at positions with shooting length R0. FIG. 7 shows defocus amounts D1, D2, and D3 for each of subjects 1, 2 and 3 when focus detection is performed in the condition described in FIG. 6. The defocus amounts in FIG. 7 are determined by assuming: (i) the defocus amount corresponding to the subject at shooting length R0 to be 0; (ii) the defocus amount corresponding to the subject at a shooting length further than R0 to be positive (front focus); and (iii) the defocus amount corresponding to the subject at a shooting length shorter than R0 to be negative (back focus). In the present embodiment, all of subjects 1, 2 and 3 approach the camera from shooting distance R0. Therefore, each of the defocus amounts D1, D2, and D3 is negative. The defocus amount corresponding to shooting length Rx as described above is defined as a lower limit df for back focus. Similarly, an upper limit dr is defined for the defocus amount of front focus.

The control circuit 15 selects defocus amounts from among a plurality of defocus amounts detected within the plurality of focus detection regions, and from within the range from the lower limit df of back focus to the upper limit dr of front focus. The control circuit 15 determines the smallest defocus amount from among the selected defocus amounts as the final defocus amount DF. In the embodiment described in FIG. 7, defocus amount D2 for subject 2 is the smallest defocus amount within the selection range from df to dr. Therefore, defocus amount D2 is determined as the final defocus amount.

Figure 8:
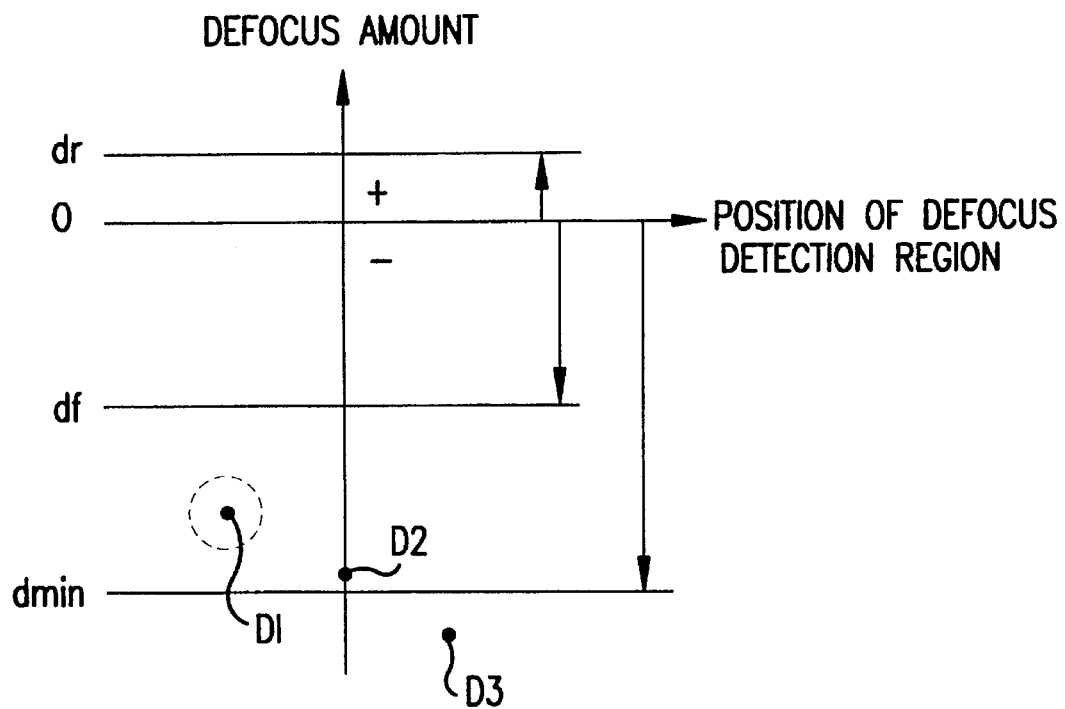
FIG. 8 is a diagram that depicts a method to determine the final defocus amount.

If all the defocus amounts D1, D2, and D3 are less than or equal to df, as described in FIG. 8, and the smallest defocus amount is not found within the selection range from df to dr, then the minimum defocus amount dmin (which is less than the lower limit df for back focus), is established. Defocus amounts within the range from the lower limit df to the minimum defocus amount dmin are then selected. The largest defocus amount from among those selected is designated as the final defocus amount DF. In the embodiment described in FIG. 8, the defocus amount D1 for subject 1 is the largest within the selection range between dmin and df. Therefore, the defocus amount D1 is determined to be the final defocus amount DF. If no defocus amount is found within the selection range from dmin to df, then the camera indicates that focus detection is not possible.

In this way, the defocus amount for an undesired object can likely be eliminated so that selection of a defocus amount for an intended subject that is approaching the camera is ensured even when the approaching subject nears at high speed and exceeds the lower limit df of defocus amounts for back focus.

Furthermore, establishing the upper limit dr of defocus amounts for front focus prevents the camera from focusing on the background even if subjects leave the focus detection region because the photographer's hand moves or shakes. Under normal conditions, shooting a photograph in which all the subjects are moving further away from the camera is very rare. Therefore, the probability of focusing on the background can be decreased by decreasing the absolute value of the upper limit dr of defocus amounts for front focus so that it is less than the lower limit df of defocus amounts for back focus. This method of determining the final defocus amount as described above will be referred to hereinafter as the "within range closest distance mode."

Figure 9:
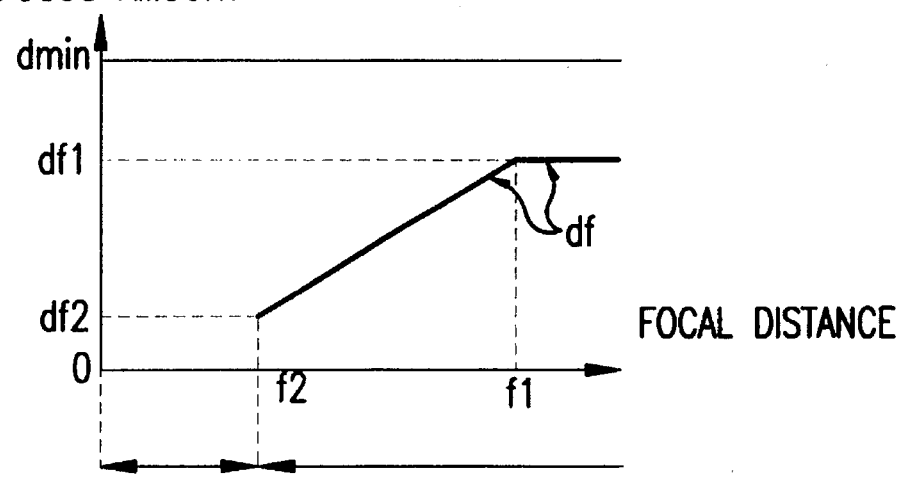
FIG. 9 is a graph that depicts a relationship between the focal length and the lower limit df of the defocus amounts for back focus.

The control circuit 15 further changes the lower limit df of defocus amounts for back focus according to the lens data. An example of such a change is described in FIG. 9. In FIG. 9, the upper limit df of the defocus amount for back focus is changed according to the focal length f of the photographic optical system 3. In the case when the focal length is less than f2, the defocus amount with the smallest absolute value among a plurality of defocus amounts is selected by the current status priority mode and the lower limit df of defocus amounts for back focus is changed linearly from df2 to df1 according to the focal length f in the range from f2 to f1. Furthermore, in the range above the focal length f1, the lower limit df of defocus amounts for back focus is fixed at df1. Thus, if the focal length f is greater than or equal to f2, the within range closest distance mode is enabled by the lower limit df of defocus amounts for back focus established according to FIG. 9.

In general, a high probability exists that the short focus side (wide edge side) will include undesired objects other than the subject in the focus detection region. Therefore, unnecessary focusing on the undesired object is prevented by establishing the current status priority mode. Furthermore, because the change in defocus amount per unit distance change is large for the long focus side (narrow edge side) an approaching subject can be captured in the within range closest distance mode, even when only part of the subject is approaching the camera by increasing the lower limit df of defocus amounts for back focus according to the focal distance. Moreover, in case the focal length f is larger than or equal to the focal length f1, the tendency to focus on an undesired object because the df value is too high is prevented by fixing the lower limit df of defocus amounts for back focus as a constant.

Figure 10:
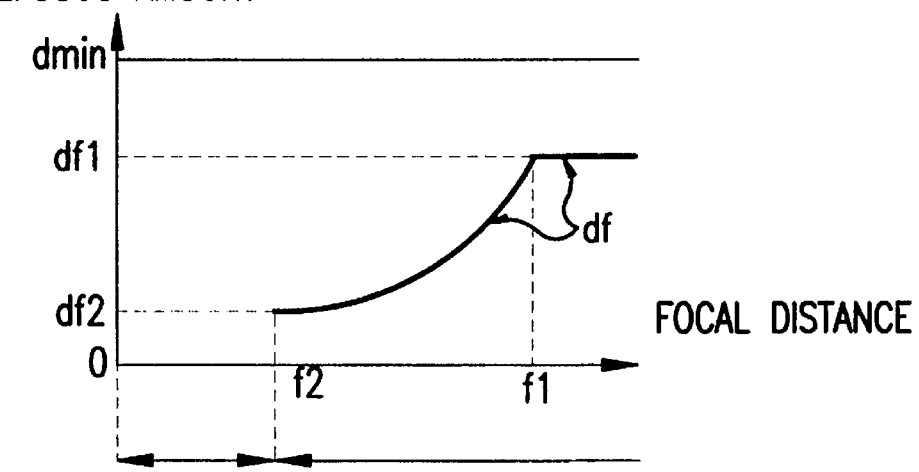
FIG. 10 is a graph that depicts a relationship between the focal length and the lower limit df of defocus amounts for back focus.
Figure 11:
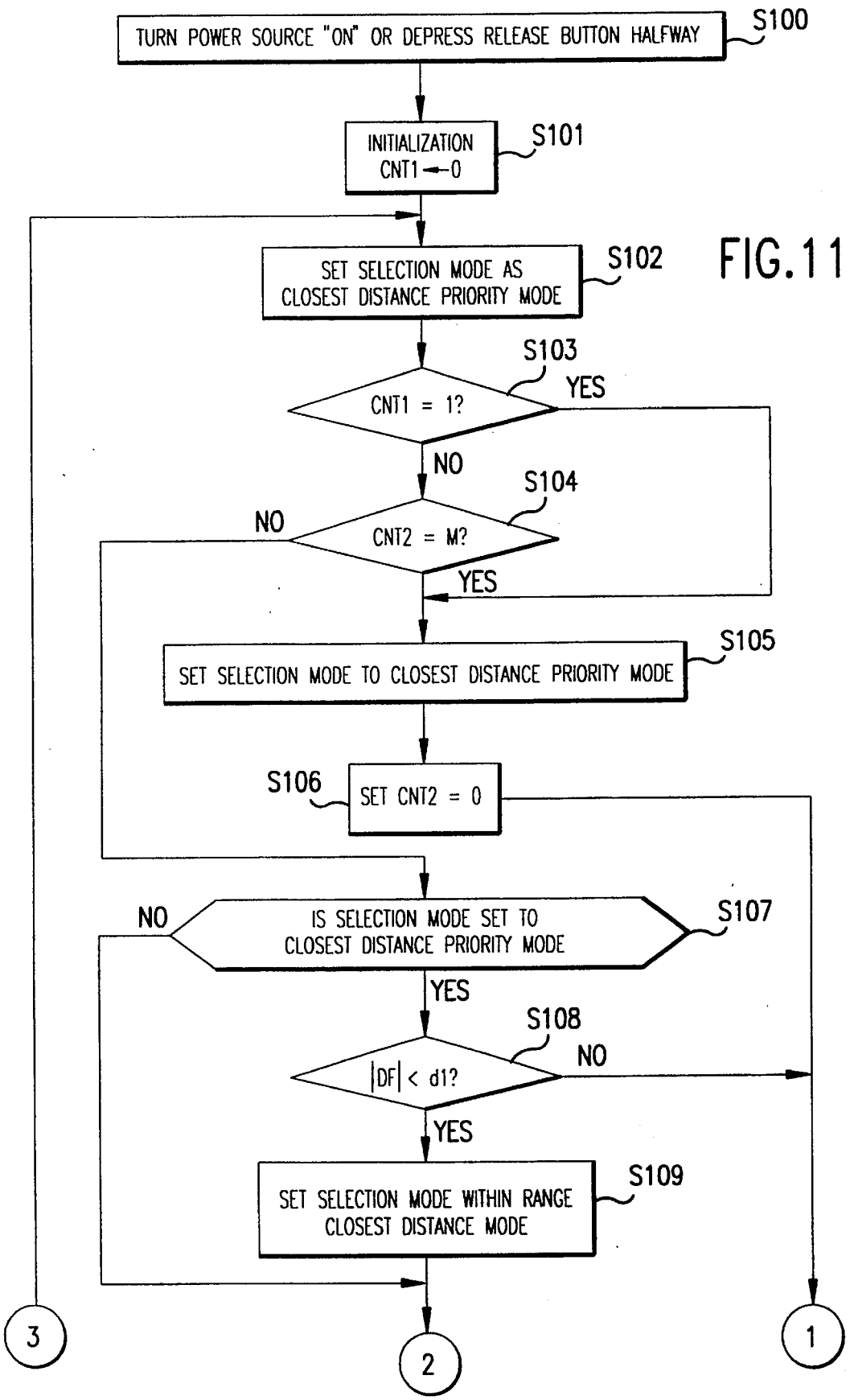
FIG. 11 is a flow chart that depicts a control program of the microcomputer of the present invention.
Figure 12:
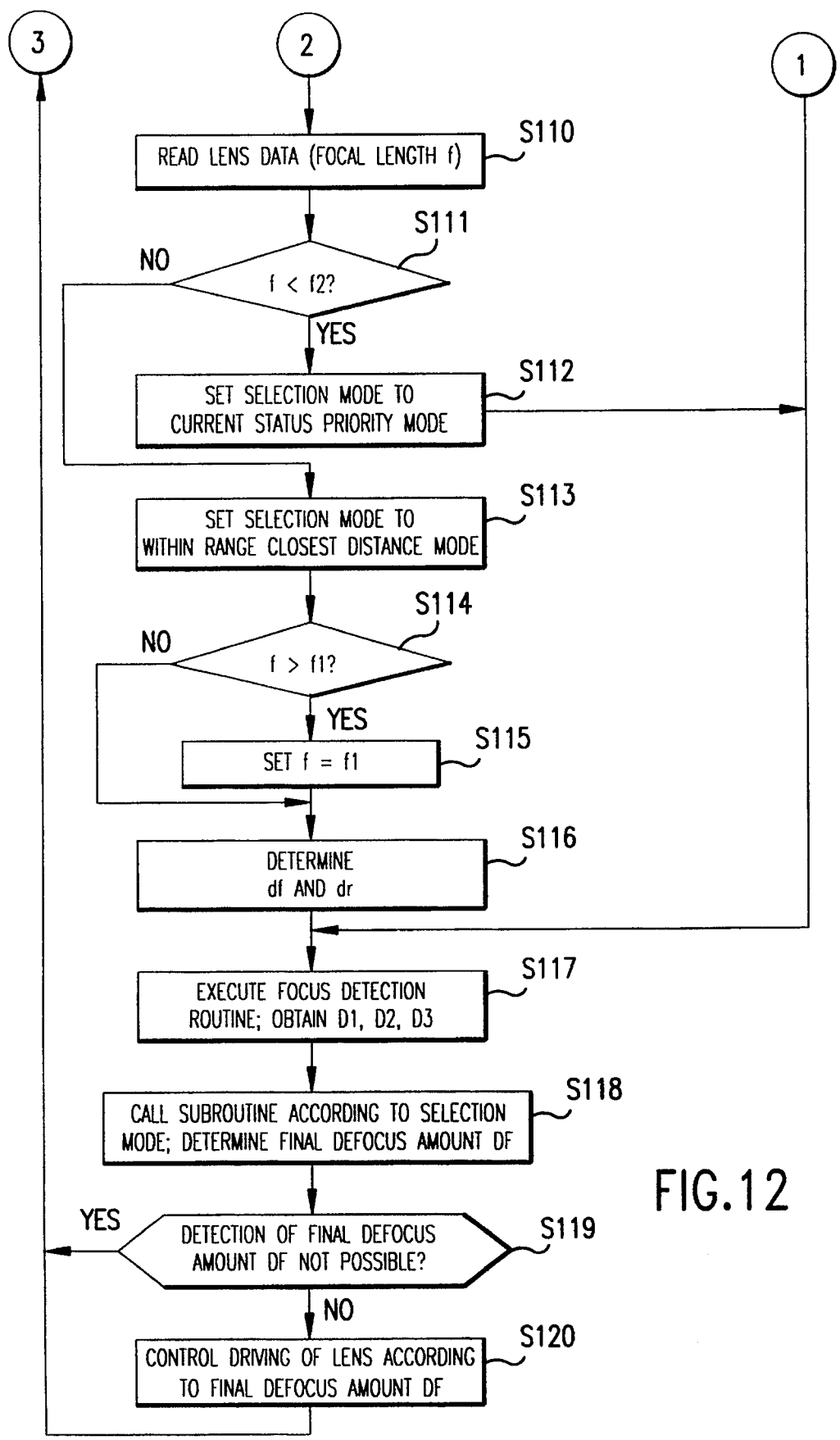
FIG. 12 is a flow chart that depicts the control program of the microcomputer that continues from FIG. 11.

FIG. 10 shows another relationship between the upper limit df of the defocus amount for back focus and the focal length f. In this embodiment, the upper limit df of the defocus amount for back focus is changed non-linearly from df2 to df1 according to the range of the focal length from f2 to f1. In other words, the upper limit df of the defocus amount for back focus is established according to the following formula based on the focal length f, $$df = K \cdot f^2 \quad (1)$$

where K is a constant.

Thus, the upper limits df1 and df2 of defocus amounts for back focus corresponding to focal lengths f1 and f2 are obtained by:

$$df1 = K \cdot (f1)^2 \quad (2)$$

$$df2 = K \cdot (f2)^2$$

respectively.

In general, the change of defocus amount per unit focal length change is proportional to the square of focal length. Consequently, the present invention ensures that a subject approaching the camera is captured by the within distance closest distance mode, even if only part of the subject is approaching.

FIGS. 11 through 15 are flow charts describing the control program for the microcomputer in the control circuit 15. The operation of an embodiment of the present invention will be described with reference to these flow charts.

In step S100, the microcomputer begins execution of the control program by turning the power source on or after receiving a reset command in which the photographer depresses the release button halfway. At step S101, initialization is executed and a zero value is assigned to a counter CNT1. The counter CNT1 is used to determine whether the microcomputer has just begun operation.

In step S102, the counter CNT1 is incremented by 1. In step S103, the count value of the counter CNT1 is checked to see if it equals 1. If the count value is not 1, that is, if the microcomputer has not just started, the count value of the counter CNT1 is checked to see if it has reached the specified value M (step S104). The counter CNT2 counts the number of failures in final defocus amount detection during the within range closest distance mode or the current status priority mode. If the number of detection failures during the within range closest distance mode or the current status priority mode reaches M, the program advances to step S105. Otherwise, the program advances to step S107.

On the other hand, if the microcomputer is determined to have just started or if the number of detection failures reaches M during the within range closest distance mode or the current status priority mode after the microcomputer has been in operation for some time, the program advances to step S105. In step S105, the closest distance priority mode is established as the selection mode to determine the final defocus amount DF from a plurality of defocus amounts. In step S106, the counter CNT2 is set to 0 and the program advances to step S117.

If the microcomputer has been in operation for some time and the number of detection failures during the within range closest distance mode or the current status priority mode has not reached M, the program determines whether the selection mode is the closest distance priority mode (step S107). If the selection mode is not the closest distance priority mode, the program advances to step S110. If the selection mode is the closest distance priority mode, the program advances to step S108 and determines if the absolute value of the previous final defocus amount DF is less than or equal to the specified value d1. If the absolute value is greater than the specified value d1, the program maintains the closest distance priority mode and moves to step S117. However, if the absolute value of the previous defocus amount is less than or equal to the specified value d1, the program advances to step S109 and changes the selection mode to the within range closest distance mode.

At this point, the program assigns a value smaller than the absolute value of the lower limit df of defocus amounts for back focus as the specified value d1. Thus, a situation in which the closest distance priority mode is resumed immediately after changing the selection mode to the within range closest distance mode is avoided. Moreover, by making the specified value d1 less than or equal to the focus zone width (the lens cannot be driven if the defocus amount is smaller than the focus zone width), accurate focusing on subjects selected by the closest distance priority mode is guaranteed.

In step S110, the program reads the lens data, including the focal length f, from the lens information memory 18 and advances to step S111 to determine if the focal length f is less than or equal to the specified value f2. If the focal length f is less than or equal to f2, the program advances to step S112 to establish the current status priority mode as the selection mode, and then advances to step S117. On the other hand, if the focal length f is greater than the specified value f2, the program advances to step S113 to establish the within range closest distance mode as the selection mode. In step S114, the program determines if the focal length f is greater than or equal to the specified value f1 and, if the focal length f is less than f1, the program skips step S115 and advances to step S116. On the other hand, if the focal length f is greater than or equal to the specified value f1, the program advances to step S115 and, after assigning the value of the specified value f1 to the focal length f, advances to S116. In step S116, the lower limit df of defocus amounts for back focus is determined according to the focal length f as described in FIG. 9 and FIG. 10, and the upper limit dr of defocus amounts for front focus is determined.

Figure 13:
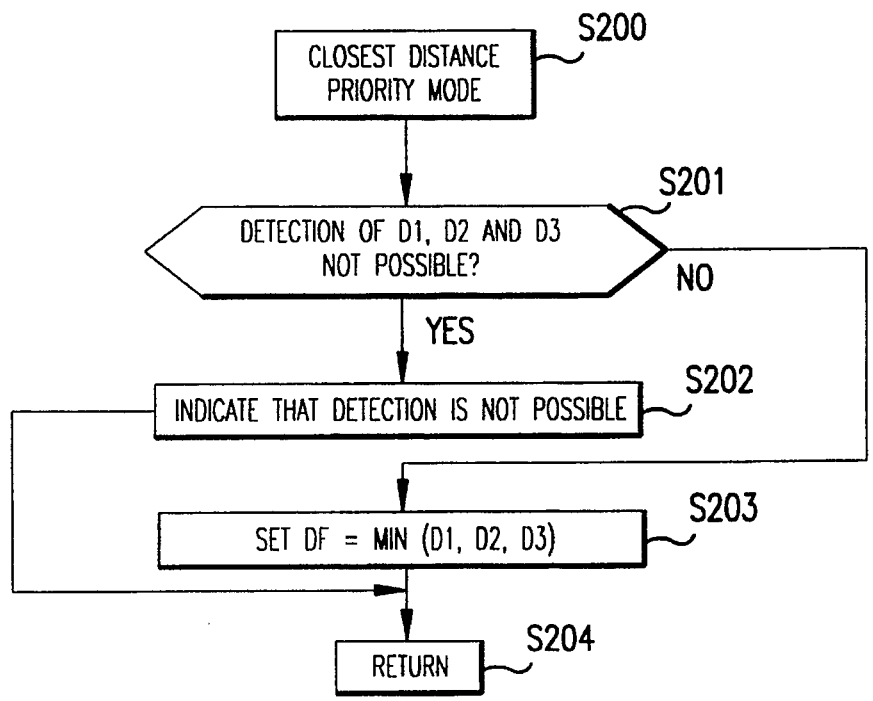
FIG. 13 is a flow chart that depicts a sub-routine of the closest distance priority mode.
Figure 14:
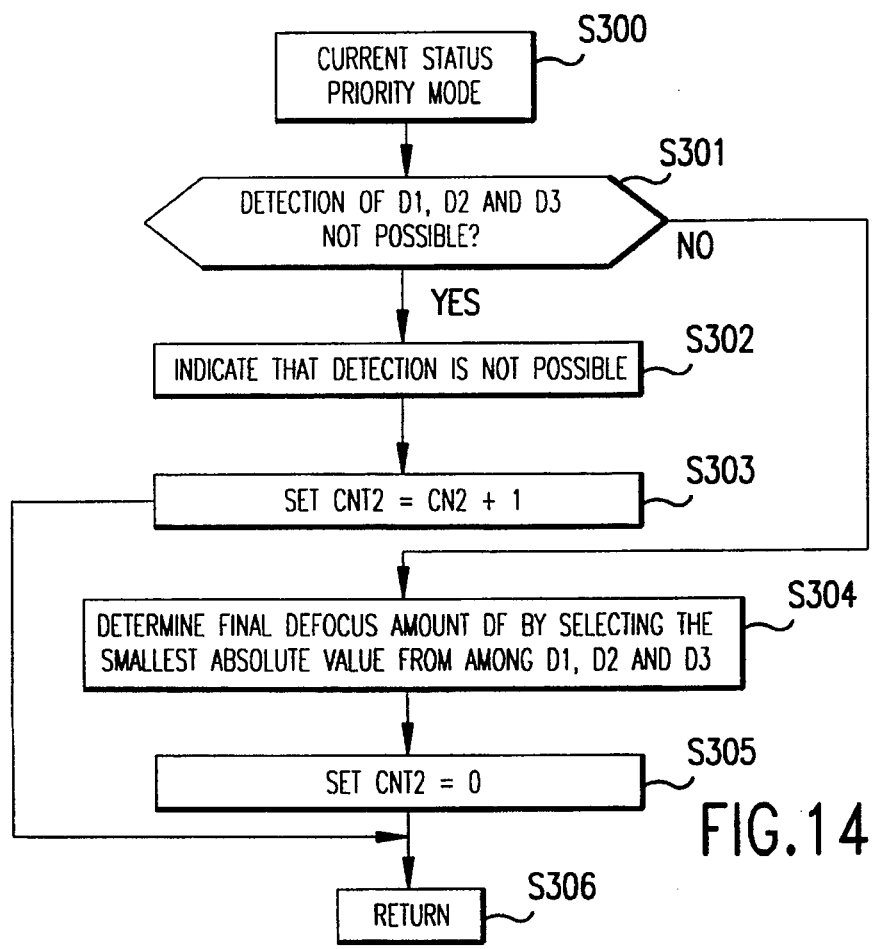
FIG. 14 is a flow chart that depicts a sub-routine of the current status priority mode.
Figure 15:
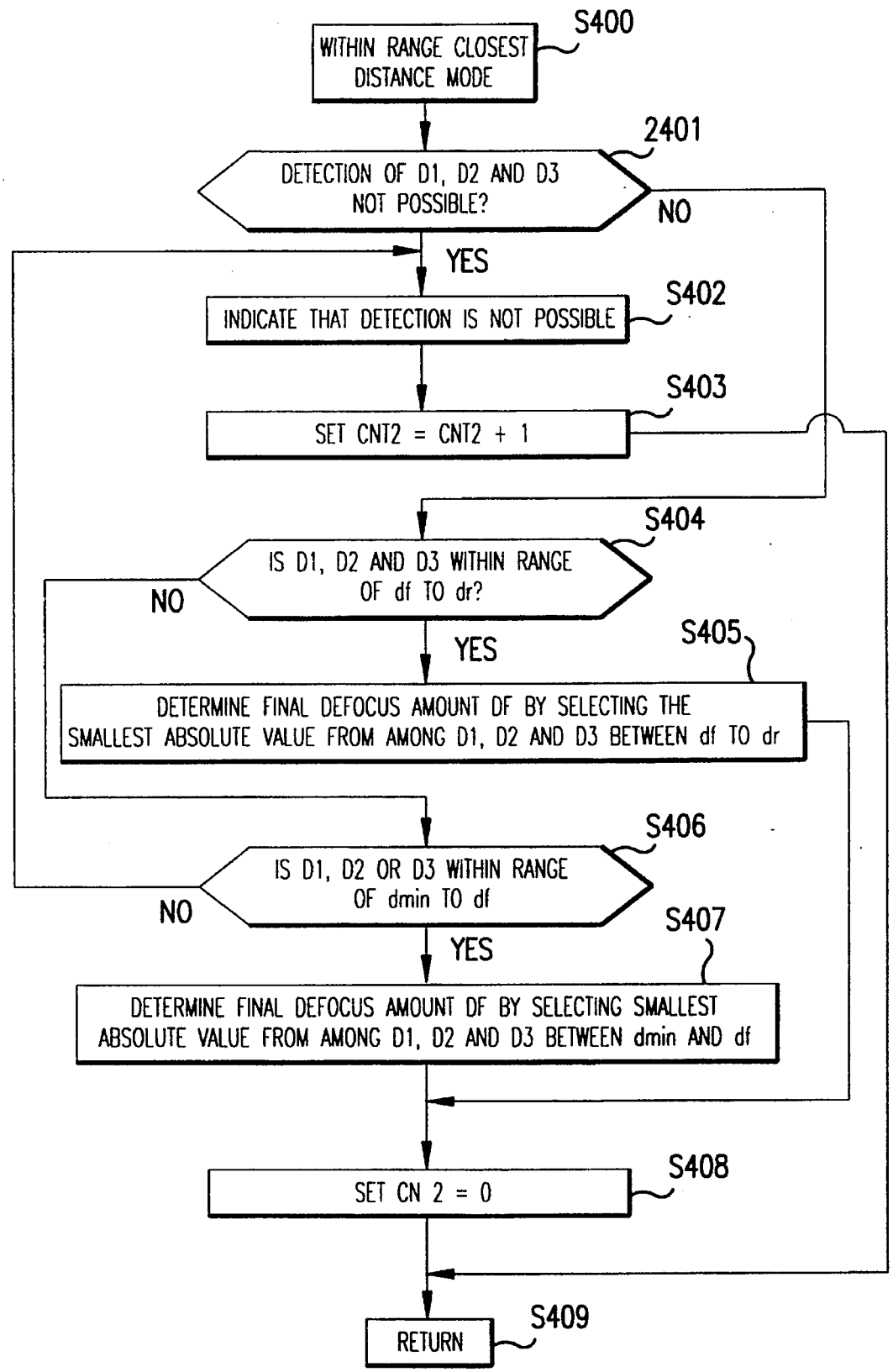
FIG. 15 is a flow chart that depicts a sub-routine of the within range closest distance mode.
Figure 16:
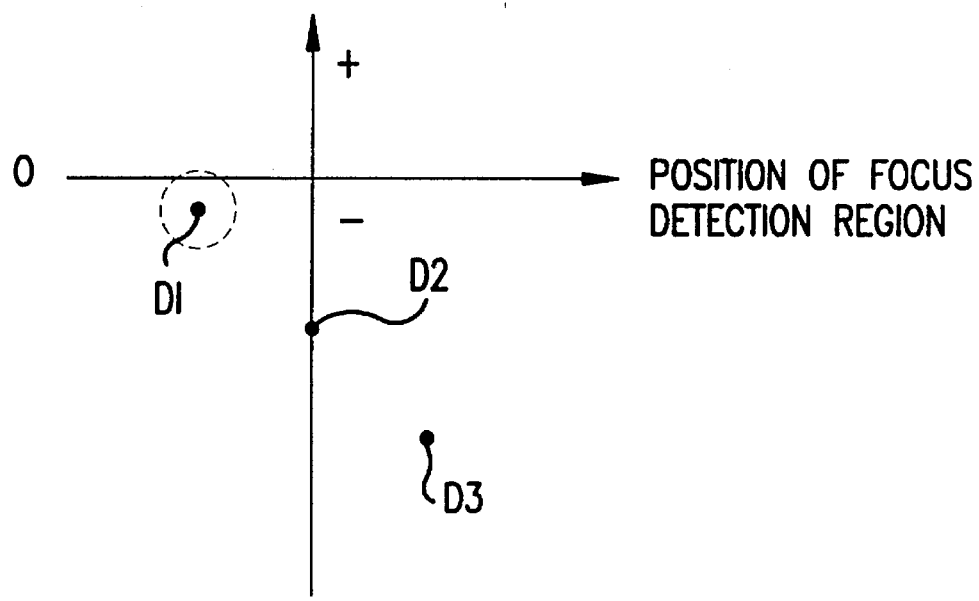
FIG. 16 is a diagram that depicts a method to determine the final defocus amount in the current status priority mode.
Figure 17:
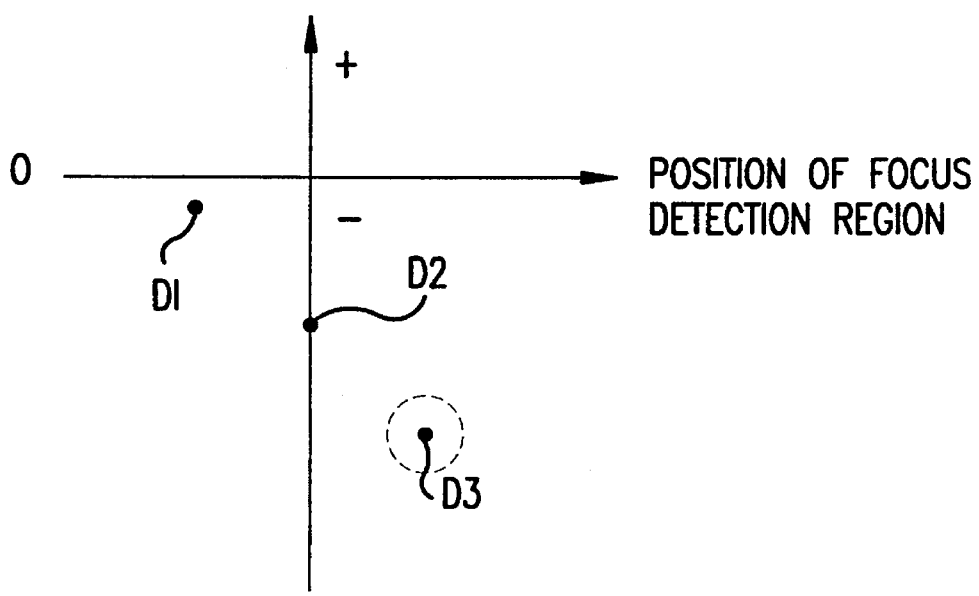
FIG. 17 is a diagram that depicts a method to determine the final defocus amount in the closest distance priority mode.
Figure 18:
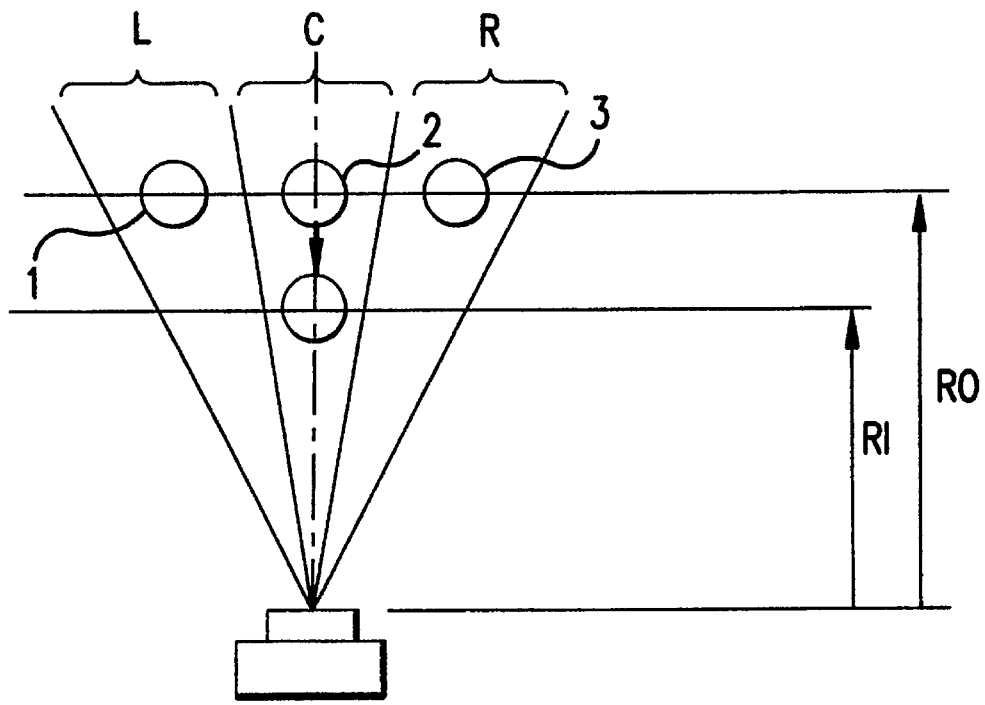
FIG. 18 is a diagram that depicts a problem in the conventional auto focus adjustment system.
Figure 19:
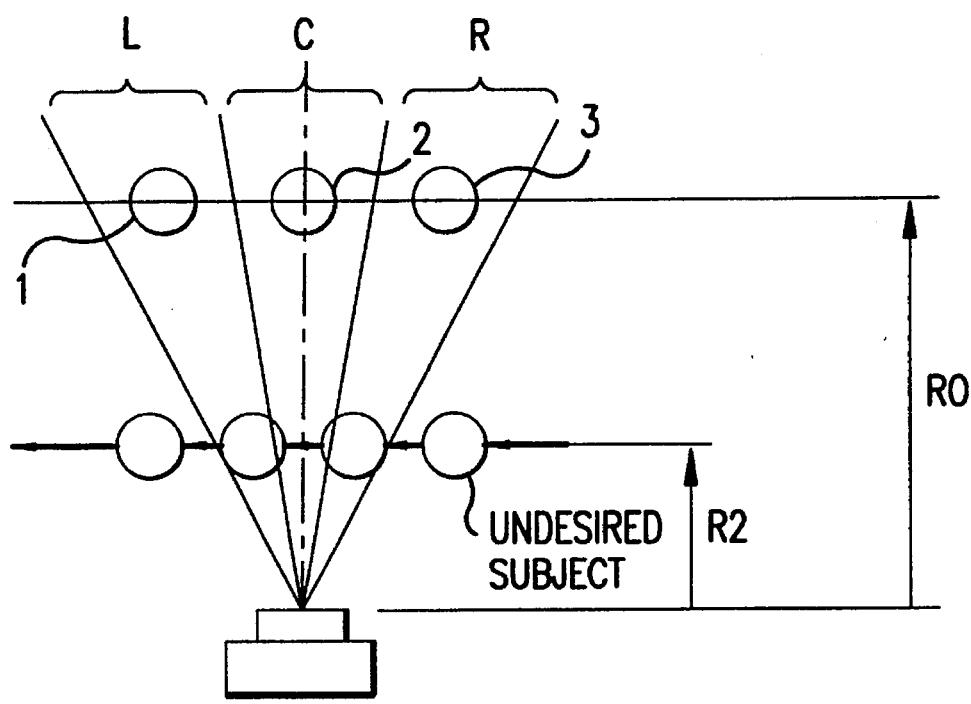
FIG. 19 is a diagram that depicts another problem in the conventional auto focus adjustment system.

In step S117, defocus amounts D1, D2, and D3 of focus detection range FL, FC, and FR are detected by the first, second and third focus detection systems 7, 8 and 9. In step S118, a subroutine described in FIGS. 13 through 15 is executed according to the selection mode, and the final defocus amount DF is determined. In step S119, the program determines if detecting the final defocus amount is possible and, if detection is not possible, the program returns to step S102 without executing control over the device that drives the photographic optical system 23. On the other hand, if detection is possible, the program advances to step S120 and computes the lens driving amount based on the final defocus amount DF and drives the motor 17 by controlling the driving circuit 16, which drives the photographic optical system 23. The program then returns to step S102 and repeats the process described in the preceding paragraphs.

A method of determining the final defocus amount DF by the closest distance priority mode will be explained with reference to the closest distance priority mode subroutine shown in FIG. 13. When the subroutine is called by the main program at step S200, the program advances to step S201. In step S201, the program determines if detecting all the defocus amounts D1, D2, and D3 with the first, second and third detection systems 7, 8 and 9 is possible. If detection is not possible, the program advances to step S202, indicates that detection of the final defocus amount DF is not possible, and returns to the main program depicted in FIG. 11 and FIG. 12 from step S204. On the other hand, if detection of a defocus amount is possible for at least one of the focus detection systems 7, 8 and 9, the program advances to step S203 and selects the smallest defocus amount detected as the final defocus amount DF and returns to the main program from step S204.

A method of determining the final defocus amount DF by the current status priority mode will be explained with reference to the current status priority mode subroutine shown in FIG. 14. When the subroutine is called by the main program in step S300, the program advances to step S301. In step S301, the program determines if detecting all the defocus amounts D1, D2, and D3 by the first, second and third detection systems 7, 8 and 9 is possible. If detection is not possible, the program advances to step S302, indicating that detection of the final defocus amount DF is not possible. In step S303, the program increments the counter CNT2 and returns to the main program depicted in FIGS. 11 and 12 from step S306. On the other hand, if detection of a defocus amount is possible in at least one of the focus detection systems 7, 8 and 9, the program advances to step S304 and selects the defocus amount with the smallest absolute value detected as the final defocus amount DF. In step S305, the program resets the counter CNT2 to 0 and returns to the main program from step S306.

A method of determining the final defocus amount DF by the within range closest distance mode will be explained with reference to the within range closest distance mode subroutine shown in FIG. 15. When the subroutine is called by the main program in step S400, the program advances to step S401. In step S401, the program determines if detecting all the defocus amounts D1, D2, and D3 by the first, second and third detection systems 7, 8 and 9 is possible. If detection is not possible, the program advances to step S402, indicating that detection of the final defocus amount DF is not possible. In step S403, the program increments the counter CNT2 and returns to the main program depicted in FIGS. 11 and 12 from step S409. On the other hand, if detection of a defocus amount is possible for at least one of the focus detection systems 7, 8 and 9, the program advances to step S404 and determines whether any of the defocus amounts (D1, D2, D3) exists in the defocus amount selection range of df to dr. If any of the defocus amounts exists in the defocus amount selection range of df to dr, the program advances to step S405. Otherwise, the program advances to step S406. If any of the defocus amounts is within the selection range, the program selects the smallest of the defocus amounts D1, D2, and D3 within the defocus amount selection range as the final defocus amount. After resetting the counter CNT2 to 0 in step S408, the program returns to the main program shown in FIG. 11 and FIG. 12 from step S409.

On the other hand, if none of the defocus amounts (D1, D2, D3) exists in the defocus amount selection range of df to dr, the program in step S406 determines if any of the defocus amounts exist within the selection range dmin to df. If one or more do exist, the program advances to step S407, otherwise, the program advances to step S402. If any of the defocus amounts exists in the selection range of dmin to df, the program selects the largest of the defocus amounts D1, D2, and D3 in the defocus amount selection range dmin to df as the final defocus amount. After resetting the counter CNT2 to 0 in step S408, the program the returns to the main program from step S409. On the other hand, if none of defocus amounts exists in the selection range dmin to df, the program indicates at step S402 that detection of the final defocus amount is not possible, increments the counter CNT2 in step S403 and returns to the main program after step S409.

As described above, when the operation of the microcomputer is started by turning on the power source or by executing the reset operation of the release button, the closest distance priority mode is established. Subsequently, the camera focus is adjusted automatically such that the smallest defocus amount from among a plurality of defocus amounts corresponding to the subject at the closest distance is selected as the final defocus amount. Moreover, when the final defocus amount DF becomes in focus or near focus (defocus amount d1), the focusing on undesired objects is prevented by switching to either the within range closest distance mode or to the current status priority mode depending on the focal length. Furthermore, if detection of the final defocus amount is not possible for a specified consecutive number of times during either the within range closest distance mode or the current status priority mode, the program decides that the photographer has changed the desired photography subject and is executing focus detection with respect to another subject. Accordingly, the program resumes auto focus adjustment for the closest object by switching to the closest distance priority mode.

In the embodiment described above, the final defocus amount is determined from a plurality of defocus amounts, but it is equally effective to determine defocus amounts that are within a specified difference of the final defocus amount and use the average of the determined defocus amounts as the final defocus amount. Moreover, it is also permissible to create a plurality of subgroups from among a plurality of defocus amounts by grouping defocus amounts with close values and using representative defocus amounts from each group as the multiplicity of defocus amounts described in the above embodiment. In this manner, a more stable focus adjustment is obtained because the scattering of defocus amounts caused by noise, etc. is decreased.

In the embodiment described above, the closest distance priority mode is resumed when detecting that the final defocus amount is not possible for a specified consecutive number of times during the current status priority mode or the within range closest distance mode. However, it is equally desirable to have the closest distance priority mode resume when detection of the final defocus amount is not possible for a specified continuous time interval during the current status priority mode or the within range closest distance mode. In this manner, the program becomes more useful because it can resume the closest distance priority mode after a specified time interval even if the focus detection cycle becomes longer during a time of low illumination.

Moreover, the time interval after which the closest distance priority mode is resumed can be made constant by providing a sensor to detect the illumination of a subject or by detecting the electric charge accumulation time of a focus detection image sensor and making the specified number M smaller during low illumination or when the electric charge accumulation time is longer.

In the embodiment described above, the lower limit df of defocus amounts for back focus is changed according to the focal length read from the lens information memory 18 by the control circuit 15, but it is equally effective to change the lower limit df of defocus amounts for back focus as set forth in the following conditions:

(1) Using a conversion coefficient K1 read from the lens information memory 18 to convert the unit defocus amount into the driving amount of the photographic optical system 23 and changing the lower limit df of defocus amounts for back focus according to the conversion coefficient K1. In other words, the absolute value of df is decreased when the conversion coefficient K1 is larger.

If an undesired object that enters the focus detection region is focused upon, the driving time required to return to focusing on the shooting target subject increases as the value of the conversion constant K1 of the lens increases. Thus, changing the selection range of defocus amounts described above by making the absolute value of df smaller for lenses with a larger conversion coefficient K1 decreases the probability that an undesired object will enter the selection region.

(2) In a camera in which the manual focus ring interlocks with the lens driving device and rotates during auto focus adjustment, using a conversion coefficient K2 read from the lens information memory 18 to convert the unit defocus amount into the angle of rotation of the manual focus ring and changing the lower limit df of defocus amounts for back focus according to the conversion coefficient K2. In other words, the absolute value of df is decreased when the conversion coefficient K2 is larger.

If an undesired object that enters the focus detection region is focused upon, the angle through which the manual focus ring rotates increases as the conversion coefficient K2 of the lens increases. Thus, decreasing the absolute value of df for lenses with a larger conversion coefficient K2 decreases the probability that undesired objects will enter the selection region.

(3) Changing the lower limit df of defocus amounts for back focus depending upon whether continuous shooting is enabled. Continuous shooting is a photography mode in which the auto focus adjustment operation is enabled while the release button is half-depressed, and shooting action and auto focus adjustment action continuously occur when the release button is fully depressed. In other words, the absolute value of df must be less during the continuous shooting mode than during the non-continuous shooting mode. Changes in the defocus amounts are slight during continuous shooting because, in general, the same subject is being photographed in this mode.

(4) Making the absolute value of df larger during continuous shooting than during non-continuous shooting. Because focus detection motion during continuous shooting occurs between the shooting motion or between frames, the focus detection interval is longer during continuous shooting than during non-continuous shooting. Therefore, the change in defocus amount between frames increases when a part of the subject approaches the camera. Thus, the defocus amount selection range should be widened by making the absolute value of df larger during continuous shooting. With this change, the approaching subject is reliably photographed. Although this condition appears to contradict the condition set forth above in paragraph (3), it gives the photographer an option to select whether preventing false focusing on an undesired object or capturing an approaching subject is preferred.

(5) Detecting the illumination of the subject or detecting the charge accumulation time of the image sensor for focus detection. If illumination is low or if the charge accumulation time is long, the absolute value of df should be increased. If the illumination decreases, the charge accumulation time of the image sensor increases, which in turn makes the focus detection interval longer in duration. Thus, when part of the subject approaches, the change in defocus amount between focus detection cycles increases. Therefore, the selection range of defocus amounts is widened by making the absolute value of df larger when illumination is low or when charge accumulation time is long. As a result, the approaching subject can be reliably photographed.

(6) Determining the degree of confidence in focus detection results (defocus amounts) and changing the lower limit df of defocus amounts for back focus according to the determined degree of confidence. The total sum of the absolute values of differences in outputs from adjacent pixels of the image sensor is computed for use as the valuation amount that represents the contrast of the subject image. The higher the contrast, the lower the scattering of defocus amounts for each detection caused by noise, interference, etc. Lower scattering in turn suggests a higher degree of confidence. Therefore, the absolute value of df is higher when the degree of confidence is lower than when the degree of confidence is higher. When the degree of confidence is lower, the scattering of detection results increases. Decreasing the absolute value of the lower limit df of defocus amounts for back focus makes exceeding of the upper limit easier due to the increased scattering. As a result, defocus amounts with large scattering from the selection range can be eliminated.

(7) Changing the lower limit df of defocus amounts for back focus according to the shooting conditions established manually by the photographer. With this change, setting an optimal lower limit df of defocus amounts for back focus according to shooting conditions such as moving subjects and still subjects is possible. In addition, the lower limit df of defocus amounts for back focus can be set manually. Moreover, the lower limit df of defocus amounts for back focus can be established, in connection with the manual setting of the shooting mode, such as the sports photography mode or the portrait photography mode.

(8) Reading the f-value from the lens information memory 18 at open aperture of the photographic optical system 3 and changing the lower limit df of defocus amounts for back focus in accordance with this f-value. In other words, the absolute value of the lower limit df of defocus amounts for back focus is decreased when the f-value at open aperture is lower than when the f-value at open aperture is higher. If the f-value at open aperture is lower, the focal depth decreases and an out-of-focus condition becomes more noticeable than when shooting with a larger f-value at open aperture, even if the image plane is shifted with the same defocus amount. Thus, an out-of-focus condition is prevented by decreasing the absolute value of df for lenses with a small f-value at open aperture.

(9) Detecting the absolute position of the photographic optical system 23 in the direction of the optical axis, and obtaining, at that time, the subject length on which the photographic optical system 23 focuses. The shooting magnification is then obtained by dividing the focal length by the subject length. The shooting magnification is assumed to be positive. The lower limit df of defocus amounts for back focus is varied according to the shooting magnification. In other words, the absolute value of df is higher when the shooting magnification is higher than when the shooting magnification is lower. The larger the shooting magnification, the larger is the amount of shift of the image plane on the image plane side to the extent of unit distance change on the subject side. Thus, a subject approaching the camera can be reliably photographed if the selection range of defocus amounts is widened by increasing the absolute value of df.

(10) Compute the image plane moving speed from changes in past defocus amounts and change the lower limit df of defocus amounts for back focus in accordance with the computed image plane moving speed. In other words, increase the absolute value of df as the image plane moving speed becomes larger. If the image plane moving speed is high, the amount of image plane change increases between focus detection cycles. Therefore, the defocus amount selection range should be widened by making the absolute value of df larger. As a result, a subject approaching the camera can be reliably photographed.

(11) Measure the elapsed time beginning at the moment when the camera changes from non-focusing to focusing and change the lower limit df of defocus amounts for back focus in accordance with the time measured. In other words, increase df as the elapsed time lengthens. Because the probability that the subject distance will change is low immediately after focusing, a greater likelihood exists that unnecessary focusing on an undesired object will be prevented.

The upper limit dr of defocus amounts for front focus was held constant in the embodiment described above. It is equally effective, however, to have the value of dr change according to conditions (1) through (11), similar to the lower limit df of defocus amounts for back focus. By doing so, stable focus detection occurs, not only for subjects approaching the camera, but also for subjects moving away from the camera.

Furthermore, it is also desirable to provide display equipment for the embodiments described above to display, e.g., the selection mode (e.g., current status priority mode, within range closest distance mode, or closest distance priority mode). The program can also be configured so that it can be overridden to restore the closest distance priority mode by half-depressing the release button after confirming the selection mode being displayed when the current status priority mode or the within range closest distance mode is enabled by focusing on an unintended subject.

As described above, the present invention selects defocus amounts that are larger than specified negative defocus amounts from among a plurality of defocus amounts detected in a plurality of focus detection regions, and determines the smallest defocus amount from among the selected defocus amounts as the final defocus amount. Thus, (1) In the case when part of the subject approaches the camera after it has been focused on a plurality of subjects located at the same shooting length, focusing on this part of the subject reliably occurs, and (2) In the case when an undesired object smaller than the focus detection region crosses in front of and close to the camera after focusing on a plurality of subjects located at the same shooting length, focusing on the plurality of targeted subjects is maintained without focusing on the undesired object.

While this invention is described in conjunction with specific embodiments thereof, many alternatives, modifications and variations will be apparent to those skilled in the art. Accordingly, the preferred embodiments of the invention as set forth above are intended to be illustrative, not limiting. Various changes may be made to the invention without departing from its true spirit and scope as defined in the following claims.

What is claimed is:

1. An auto focus adjustment system comprising:

a photographic optical system that forms an image plane;

focus detection device for detecting a plurality of defocus amounts corresponding to a plurality of focus detection regions arranged in a photographic field of said photographic optical system, each of said plurality of defocus amounts representing a defocus deviation amount from a predetermined focus plane to said image plane of each of said focus detection regions, wherein said defocus amount is positive if said image plane of said photographic optical system is formed on a photographic optical system side of the focus plane, and said defocus amount is negative if said image plane is formed on a side of the focus plane opposite said photographic optical system side;

defocus amount determination circuit for determining a final defocus amount based on the plurality of defocus amounts detected by said focus detection device, said defocus amount determination circuit selecting defocus amounts greater than a predetermined negative defocus amount from said plurality of defocus amounts detected by said focus detection device and determining a least defocus amount from among the selected defocus amounts as said final defocus amount; and drive control circuit for driving said photographic optical system based on said final defocus amount determined by said defocus amount determination circuit.

2. The auto focus adjustment system according to claim 1, wherein said defocus amount determination circuit changes said predetermined negative defocus amount based on a focal length of said photographic optical system.

3. The auto focus adjustment system of claim 1, wherein said defocus amount determination circuit determines the final defocus amount as a defocus amount having a minimum absolute value from among a plurality of defocus amounts detected by said focus detection device if a focal length of said photographic optical system is less than a predetermined focal length.

4. The auto focus adjustment system according to claim 1, wherein said defocus amount determination circuit changes said predetermined negative defocus amount based on a conversion coefficient to convert said final defocus amount to a driving amount of said photographic optical system.

5. The auto focus adjustment system according to claim 1, wherein said defocus amount determination circuit changes said predetermined negative defocus amount based on a photographic mode.

6. The auto focus adjustment system according to claim 1, wherein said defocus amount determination circuit changes said predetermined negative defocus amount based on photometric results determined with respect to a photographic subject.

7. The auto focus adjustment system according to claim 1, wherein said defocus amount determination circuit determines a degree of confidence in focus detection results detected by said focus detection device and changes said predetermined negative defocus amount based on said degree of confidence.

8. The auto focus adjustment system according to claim 1, wherein said defocus amount determination circuit changes said predetermined negative defocus amount based on a f-value at an open aperture of said photographic optical system.

9. The auto focus adjustment system according to claim 1, wherein said defocus amount determination circuit changes said predetermined negative defocus amount based on a shooting magnification.

10. The auto focus adjustment system according to claim 1, wherein said defocus amount determination circuit computes a subject image plane moving speed based on said plurality of defocus amounts detected by said focus detection device, and changes said predetermined negative defocus amount based on said subject image plane moving speed.

11. The auto focus adjustment system according to claim 1, wherein said defocus amount determination circuit measures a time interval required to move from a non-focus condition to a focus condition and changes said predetermined negative defocus amount based on said time interval.

12. An auto focus adjustment system comprising:

an optical system that forms a subject image on a focus plane;

focus detection circuit for detecting first defocus amounts of said subject image in a plurality of focus detection regions arranged on said focus plane;

a setting circuit for setting a defocus amount range;

defocus amount determination circuit for selecting the first defocus amounts within the defocus amount range and for determining a second defocus amount based on said first defocus amounts located within said defocus amount range; and driving device for driving said optical system based on said second defocus amount determined by said defocus amount determination circuit.

13. The auto focus adjustment system of claim 12, wherein said defocus amount determination circuit determines said second defocus amount to be a defocus amount corresponding to a closest subject from among said first defocus amounts located within said defocus amount range.

14. The auto focus adjustment system of claim 12, wherein said setting circuit changes said defocus amount range based on optical characteristics of said optical system.

15. The auto focus adjustment system of claim 12, wherein said setting circuit changes said defocus amount range based on characteristics of said subject image.

16. The auto focus adjustment system of claim 12, wherein said setting circuit changes said defocus amount range based on an elapsed time.

17. An auto focus adjustment system comprising:

a photographic optical system that forms an image plane;

a focus detection device that detects a plurality of defocus amounts corresponding to a plurality of focus detection regions arranged in a photographic field of said photographic optical system, each of said plurality of defocus amounts representing a defocus deviation amount from a predetermined focus plane to said image plane of each of said focus detection regions, wherein the defocus amount is positive if said image plane of said photographic optical system is formed on a photographic optical system side of the focus plane, and said wherein defocus amount is negative if said image plane is formed on a side of the focus plane opposite said photographic optical system side;

a defocus amount determination device that determines a final defocus amount based on the plurality of defocus amounts detected by said focus detection device, wherein said defocus amount determination device selects defocus amounts greater than a predetermined negative defocus amount from among said plurality of defocus amounts detected by said focus detection device and determining the final defocus amount as a least defocus amount from among the selected defocus amounts; and a drive control device that drives said photographic optical system based on said final defocus amount determined by said defocus amount determination device.

18. The auto focus adjustment system according to claim 17, where said defocus amount determination device changes said predetermined negative defocus amount based on at least one of a focal length of said photographic optical system, a conversion coefficient to convert said final defocus amount to a driving amount of said photographic optical system, a photographic mode, photometric results determined with respect to a photographic subject, a degree of confidence in focus detection results, a f-value at an open aperture of said photographic optical system, a shooting magnification, a subject image plane moving speed and a time interval required to move from a non-focus condition to a focus condition.

19. An auto focus adjustment system comprising:

an optical system that forms a subject image on a focus plane;

a focus detection device that detects first defocus amounts of said subject image in a plurality of focus detection regions arranged on said focus plane:

a setting circuit that sets a defocus amount range;

a defocus amount determination device that selects the first defocus amounts within the defocus amount range and determines a second defocus amount based on said first defocus amounts located within said defocus amount range; and a driving device that drives said optical system based on said second defocus amount determined by said defocus amount determination device.

20. The auto focus adjustment system of claim 19, wherein said setting circuit changes said defocus amount range based on optical characteristics of said optical system.

21. The auto focus adjustment system of claim 19, wherein said setting circuit changes said defocus amount range based on characteristics of said subject image.

22. The auto focus adjustment system of claim 21, wherein said characteristics of said image include a distance of a subject from said optical system.

23. The auto focus adjustment system of claim 19, wherein said setting circuit changes said defocus amount range based on an elapsed time.

24. A method of automatically adjusting a camera to focus on a subject, comprising the steps of:

establishing a plurality of focus detection regions in a shooting field of a photographic optical system of said camera;

detecting a defocus amount representing a deviation amount of an image plane of said photographic optical system from a predicted focus plane for each of said detection regions, wherein a defocus amount is positive if said image plane of said photographic optical system is formed on a photographic optical system side of the predicted focus plane, and said defocus amount is negative if the image plane is formed on a side of the predicted focus plane opposite said photographic optical side;

determining a final defocus amount based on a plurality of defocus amounts detected by a focus detection device;

selecting defocus amounts from among the plurality of defocus amounts that are larger than a predetermined negative defocus amount; and determining a final defocus amount as a smallest defocus amount from among the selected defocus amounts.

25. The method of claim 24, further comprising the step of driving said photographic optical system based on said final defocus amount.

26. The method of claim 24, wherein said determining step includes changing said predetermined negative defocus amount based on optical characteristics of said photographic optical system.

27. The method of claim 24, wherein said determining step includes changing said predetermined negative defocus amount based on characteristics of said subject.

28. The method of claim 24, wherein said determining step includes changing said predetermined negative defocus amount based on an elapsed time.

* * * * *